United States Patent [19]

Parlman et al.

[11] Patent Number: 4,584,118

[45] Date of Patent: Apr. 22, 1986

[54] METAL TRITHIOCARBONATES AS DEPRESSANTS

[75] Inventors: Robert M. Parlman, Bartlesville, Okla.; Tommy L. Young, Tucson, Ariz.; Clarence R. Bresson, Bartlesville, Okla.

[73] Assignee: Phillips Petroleum Company, Bartlesville, Okla.

[21] Appl. No.: 691,608

[22] Filed: Jan. 14, 1985

Related U.S. Application Data

[62] Division of Ser. No. 436,883, Oct. 26, 1982, Pat. No. 4,510,050.

[51] Int. Cl.[4] .................... C09K 3/00

[52] U.S. Cl. .................... 252/61; 423/155; 423/178; 423/179; 423/414; 423/443; 423/560

[58] Field of Search .................... 252/61; 423/155, 178, 423/179, 414, 443, 560

[56] References Cited

U.S. PATENT DOCUMENTS

| | | | |
|---|---|---|---|
| 1,831,808 | 11/1931 | Ferris | 209/166 |
| 2,221,796 | 11/1940 | Heath et al. | 423/414 |
| 2,287,285 | 6/1942 | Bennett | 423/414 |
| 2,893,835 | 7/1959 | Stone et al. | 423/414 |
| 3,753,918 | 8/1973 | Haugwitz | 423/414 |
| 4,231,859 | 11/1980 | Huiatt et al. | 209/167 |
| 4,425,230 | 1/1984 | Andress et al. | 209/167 |

FOREIGN PATENT DOCUMENTS

| | | | |
|---|---|---|---|
| 80430 | 3/1971 | Fed. Rep. of Germany | 423/414 |

OTHER PUBLICATIONS

Dyer, "Kinetic Study of the Acid Hydrolysis of Sodium Trithiocarbonate and Its Reaction With Formaldehyde," Tappi, 49(10), 447–52, (1966), (CA 66:3962).

Bailar et al., *Comprehensive Inorganic Chemistry,* Pergamon, 1973, p. 1240.

Gmelin Handbuch der Anorganischen Chemie, 8th Ed., "Kohlonstoft", pp. 216–226, (1977) and Natrium–pp. 203–205, (1964).

*Primary Examiner*—Paul Lieberman
*Assistant Examiner*—Robert A. Wax
*Attorney, Agent, or Firm*—French and Doescher

[57] ABSTRACT

Metal trithiocarbonates such as $Na_2CS_3$ are useful depressant for such sulfided minerals as copper and iron sulfides in molybdenum recovery.

2 Claims, No Drawings

METAL TRITHIOCARBONATES AS DEPRESSANTS

This is a division of application Ser. No. 436,883, filed Oct. 26, 1982, now U.S. Pat. No. 4,510,050, issued Apr. 9, 1985.

The present invention relates to a depressant composition useful in ore flotation operations. Another aspect of this invention relates to a process for recovering minerals from ore compositions. Yet a further aspect of this invention relates to a process for preparing a depressant.

BACKGROUND OF THE INVENTION

Flotation processes are known in the art and are used for recovering and concentrating minerals from ores. In froth flotation processes the ore is crushed and wet ground to obtain a pulp. Additives such as mineral flotation or collecting agents, frothers, suppressants, stabilizers, etc. are added to the pulp to assist separating valuable materials from undesirable or gangue portions of the ore in subsequent flotation steps. The pulp is then aerated to produce a froth at the surface. The minerals which adhere to the bubbles or froth are skimmed or otherwise removed and the mineral bearing froth is collected and further processed to obtain the desired minerals. Typical mineral flotation collectors include xanthates, amines, alkyl sulfates, arene sulfonates, dithiocarbamates, dithiophosphates, and thiols.

While the art of ore flotation has reached a significant degree of sophistication it is a continuing goal in the ore recovery industry to increase the productivity of ore flotation processes and above all to provide specific processes which are selective to one ore or to one metal over other ores or other metals, respectively, which are present in the treated material.

THE INVENTION

It is one object of this invention to provide a composition useful as a depressant in ore flotation.

Another object of this invention is to provide a process to produce such a composition.

Yet a further object of this invention is to provide an improved flotation process using the new depressant composition.

A still further object of this invention is to provide an improved molybdenum flotation process in which less iron and copper contamination is present in the molybdenum recovered.

These and other objects, advantages, details, features and embodiments of this invention will become apparent to those skilled in the art from the following detailed description of the invention and the appended claims.

In accordance with this invention certain metal trithiocarbonates to be defined below have been found to be effective depressants or suppressants in ore flotation operations.

Thus in accordance with a first embodiment of this invention a process for depressing minerals in a minerals containing mixture is provided. In accordance with this invention the flotation operation is carried out with a depressant composition present in the flotation operation which comprises at least one compound selected from the group consisting of $$M_2CS_3 \text{ and } M'CS_3$$

wherein the components M which can be the same or different are selected from the group consisting of $NH_4$ and alkali metals and M' is an alkaline earth metal. Among the metal trithiocarbonates used, the alkali metal trithiocarbonates are preferred. Particularly preferred is disodium trithiocarbonate as a depressant compound in the composition. In addition to the ammonium and sodium trithiocarbonate, the invention also encompasses lithium, potassium, cesium and rubidium trithiocarbonates as well as magnesium, calcium and barium trithiocarbonates as the metal trithiocarbonates in the depressant composition.

It has been discovered in accordance with this invention that a composition containing both metal sulfides and the trithiocarbonate(s) defined above allow particularly efficiently a selective separation of molybdenum from copper and iron sulfides, and more specifically from concentrates containing these minerals, at a lower dosage level than with the metal sulfide depressant compound alone. Thus, the use of the metal trithiocarbonate as defined together with the metal sulfide compound is particularly preferred. A composition comprising metal trithiocarbonate as defined above and metal sulfide as defined below constitutes a further embodiment of this invention. The term "metal sulfide" as used above refers to a compound selected from the group consisting of $$MSH,\ M_2S,\ M'(SH)_2 \text{ and } M'S$$

wherein M is selected from the group consisting of $NH_4$ and alkali metals and M' is an alkaline earth metal.

The presently preferred depressant composition is one that is obtained by a process as described in the following. This depressant composition is most preferably an aqueous composition and is generally employed in a quantity of about 1 to about 10 lb/ton of ore. It should be noted that this range is not a critical range and that operation outside of this range is within the scope of the present invention in view of the differences in the ores to be treated and the minerals to be recovered.

In the process for producing the preferred depressant composition, and in accordance with a further embodiment of this invention, a metal sulfide compound as defined above is contacted under reaction conditions with $CS_2$. This metal sulfide compound is used in a quantity so that at least an amount of the metal sulfide compound stoichiometrically required to convert the $CS_2$ to the trithiocarbonate is used. Preferably the mole ratio of metal sulfide to carbon disulfide in this reaction is up to 10 times the stoichiometrically defined ratio.

The reaction is preferably carried out by contacting an aqueous solution containing the metal sulfide compound with $CS_2$. The metal sulfide containing aqueous solution is preferably one which contains at least 5 weight percent of the metal sulfide in the aqueous solution. The upper limit is set by the solubility of the metal sulfide in water under the reaction conditions. A preferred upper limit is about 45 weight percent for the metal sulfide in the aqueous solution to be used. The reaction conditions are not particularly critical. Generally the reaction will be carried out a temperature between room temperature and the boiling point of the aqueous metal sulfide solution under the operating pressure. The reaction is usually sufficiently completed for the purposes of this invention in a time in the range of 10 minutes to 10 hours.

The aqueous solution obtained in the preferred process of this invention can be used as such as a depressant composition in a flotation process in accordance with this invention.

Thus a yet further embodiment of this invention relates to an ore flotation process. This flotation process involves the steps of (a) mixing mineral material with water and the depressant defined above to establish a pulp,
(b) aerating the pulp to produce a froth and a tail product,
(c) separating the froth and the tail product and
(d) recovering minerals from the so separated froth and/or tail product.

Preferably in the process of this invention a frother as well as a flotation agent are employed. Several of the well known flotation agents can be used. Examples for such flotation agents are organic xanthates, organic trithiocarbonates, amines and dithiocarbamates.

The flotation agent is usually used in a quantity in the range of 0.005 to 0.5 lb/ton of mineral material.

The suppressant defined above can, in accordance with this invention, also be used with additional suppressants such as sodium cyanide, lime, zinc sulfate, starch, glue and sulfuric acid.

Furthermore, it is preferred to carry out the process defined in the presence of a frother. Examples of frothers that can be used in addition to the collector compositions defined above are polyoxyalkylene glycols and ethers having broadly a molecular weight of 400 to about 1000, and preferably a molecular weight in the range of about 420 to 780. Particularly polypropylene glycols having molecular weights of e.g., 400, 425, 750 or 900 can be used. Also polybutylene glycol and polypentylene glycol are useful materials. Examples of other frothers that may be used are methyl isobutyl carbinol, pine oil, alcohols, phenols, fatty acids and cresylic acid.

The suppressant of this invention is preferably used in a quantity in the range of about 1 to about 10 lb/ton based on a solution obtained from a 30 weight percent aqueous metal sulfide solution reacted with 5 weight percent $CS_2$. In the case of more concentrated depressant composition, this preferred range will correspondingly be shifted into lower weight ranges while more diluted depressant composition solutions will preferably be employed in weight ranges extending correspondingly into areas of higher values in lbs. of depressant per ton of material to be separated.

It is presently preferred in accordance with this invention to carry out the flotation operation and selective depression in conjunction with charcoal. Most preferably the minerals containing mixture is treated with charcoal. It is particularly advantageous to carry out a pretreatment of the mineral containing mixture with charcoal to obtain a charcoal containing mixture and thereafter to contact this charcoal containing mixture with the depressant composition defined above. It has been found that the combined operation so characterized results in yet a further improvement of the purity of the concentrate obtained. While charcoal will reduce to some extent the flotation of all the minerals its effect apparently is more significant on the undesired minerals than on the desired minerals. This has been found particularly in the case in the recovery of molybdenum and the depression of iron and copper. The amount of charcoal, when used, can be varied in broad ranges. A preferred range for the use of charcoal is about 0.5 to about 5 lb charcoal per ton of mineral material treated.

The present invention is applicable to a variety of ores. The invention is particularly suitable for sulfided ores. Among the ores the molybdenum bearing ores and especially the molybdenum bearing ores which also contain copper and iron impurities, specifically impurities of these metals in the sulfided form, are preferred. Specific examples of molybdenum bearing ores which are useful in the process of this invention are Molybdenite: $MoS_2$
Wulfenite: $PbMoO_4$
Porvellite: $Ca(Mo_1W)O_4$
Ferrimolybdite: $Fe_2Mo_3O_{12}.\ 8H_2O$ The following examples are intended to further illustrate preferred embodiments of this invention without undo limitation of the scope.

EXAMPLE 1

This example describes the process of preparing the product disclosed herein as an ore flotation reagent, namely, the sodium hydrosulfide-carbon disulfide adduct. To a 1 Liter Hastaloy stainless steel autoclave was added 310 grams of water and 107 grams (2.675 moles) of NaOH and the reactor closed. To the sealed reactor was added 91.2 grams (2.682 moles) of $H_2S$ which resulted in a very exothermic reaction. After all the $H_2S$ had been added, 25 grams (0.329 mole) of $CS_2$ was pumped in. At this point the density was measured as 1.2050 g/cc at 21° C. The contents were heated to 100° C. and density was measured until stabilized. After 3 hours, the density stabilized at 1.2090 g/cc at 28° C. Upon discharge of the reactor there was obtained 463.5 grams of an aqueous product hereinafter referred to as NaSH (30%)/$CS_2$ (5%). Similarly prepared was NaSH (30%)/$CS_2$ (10%) with the same reagents but using 50 grams of $CS_2$ and NaSH (30%)/$CS_2$ (15%) using 75 grams of $CS_2$.

EXAMPLE II

This example describes the ore flotation process used to evaluate the products disclosed as ore flotation reagents. To a 1.51 Liter Denver D-12 flotation cell was added 400 milliliters (600 grams solids) of a rougher concentrate from an ore flotation operation using a Mo bearing ore (Cyprus Bagdad Mines) along with 7.5 grams (7.5 lb/ton) of NaSH (30%)/$CS_2$ (5%), 2 drops (0.040 lb/ton) of an aromatic oil (Molyflo, Phillips Petroleum Co.) and enough water to make a 33% solids slurry. The mixture was conditioned for 5 minutes at 1100 rpm and floated for 5 minutes. The new concentrate was filtered, dried and analyzed. The run was repeated. The procedure was again repeated but with various NaSH/$CS_2$ levels as well as controls with NaSH alone. The results are listed in Table I where it can be seen the NaSH/$CS_2$ mixtures depress the flotation of Cu and Fe significantly more than NaSH alone (Runs 1 and 2) when used at the same levels. This depressant action results in a higher grade molybdenum. The results also show that the addition of charcoal to the NaSH/$CS_2$ product (Run 6) depresses even more the flotation of Cu and Fe while maintaining a high molybdenum recovery.

TABLE I

Effect of NaSH/$CS_2$ Blend as a Cu and Fe Depressant in Mo Ore Flotation

| Run No. | Depressant (% Aq.) | NaSH/$CS_2$ Mole Ratio | lb/ton | % Recovery Cu | Fe | Mo |
|---|---|---|---|---|---|---|
| Control: | | | | | | |
| 1 | NaSH (30%) | — | 3.4 | 52.8 | 39.4 | 97.7 |
| | NaSH (30%) | — | 3.4 | 52.2 | 36.5 | 97.2 |
| | | | Average = | 52.5 | 37.9 | 97.5 |
| 2 | NaSH (30%) | — | 7.5 | 11.0 | 10.6 | 97.5 |
| | NaSH (30%) | — | 7.5 | 13.2 | 9.2 | 97.2 |
| | | | Average = | 12.1 | 9.9 | 97.3 |
| Invention: | | | | | | |
| 3 | NaSH (30%)/$CS_2$ (5%) | 8:1 | 3.4 | 38.6 | 27.4 | 96.6 |
| 4 | NaSH (30%)/$CS_2$ (5%) | 8:1 | 7.5 | 9.50 | 9.26 | 96.2 |
| | NaSH (30%)/$CS_2$ (5%) | 8:1 | 7.5 | 7.23 | 6.67 | 96.3 |
| | | | Average = | 8.4 | 8.0 | 96.3 |
| 5 | NaSH (30%)/$CS_2$ (10%) | 4:1 | 7.5 | 5.93 | 5.66 | 95.7 |
| | NaSH (30%)/$CS_2$ (10%) | 4:1 | | 9.49 | 8.03 | 96.3 |
| | | | Average = | 7.71 | 6.84 | 96.0 |
| 6 | NaSH (30%)/$CS_2$ (5%) + charcoal[a] | 8:1 | 7.5<br>3.4 | 4.95 | 4.72 | 96.5 |
| | NaSH (30%)/$CS_2$ (5%) + charcoal[a] | 8:1 | 7.5<br>3.4 | 3.01 | 2.97 | 96.8 |
| | | | Average = | 4.0 | 3.8 | 96.7 |

[a]Added 1 minute before NaSH/$CS_2$

Reasonable variations and modifications which will become apparent to those skilled in the art can be made in this invention without departing from the spirit and scope thereof.

What is claimed is:

1. Depressant composition comprising (a) a trithiocarbonate selected from the group consisting of $M_2CS_3$ and $M'CS_3$ wherein the components M which can be the same or different are selected from the group consisting of $NH_4$ and alkali metals and M' is an alkaline earth metal, and (b) A composition selected from the group consisting of MSH, $M'(SH)_2$ and M'S, wherein M and M' have the same meaning as under (a).

2. Composition in accordance with claim 1 comprising $Na_2CS_3$ and NaSH.

* * * * *